Jan. 29, 1957
M. ERCHAK, JR
2,779,754
CHLORINATED ETHYLENE-ALKANOL TELOMERS
Filed Dec. 22, 1953
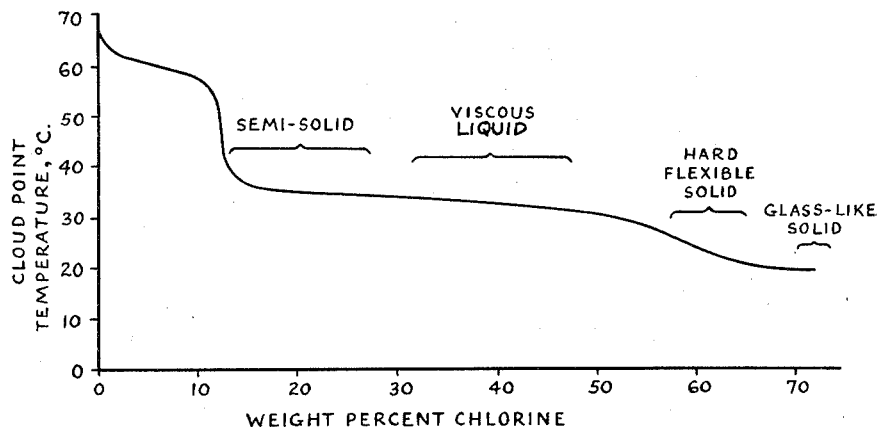
FIG.I.
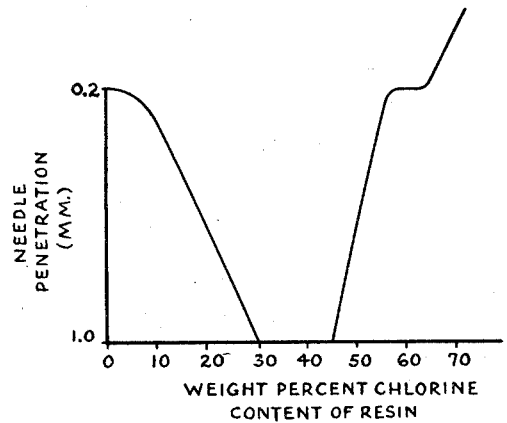
FIG.2.
INVENTOR.
MICHAEL ERCHAK, JR.
BY
ATTORNEY.

United States Patent Office 2,779,754
Patented Jan. 29, 1957

2,779,754
CHLORINATED ETHYLENE ALKANOL TELOMERS

Michael Erchak, Jr., Morris Township, Morris County, N. J., assignor to Allied Chemical & Dye Corporation, New York, N. Y., a corporation of New York Application December 22, 1953, Serial No. 399,708

8 Claims. (Cl. 260—94.9)

This invention relates to chlorinated synthetic resins derived from the hard, high-melting wax reaction product of ethylene and a lower alkanol, and more particularly to resins of this type containing specific chlorine content.

Heretofore, in this country and abroad, halogenated compounds have been made having probably essentially a paraffinic carbon-hydrogen skeleton. For example, British Patent 481,515, issued on March 11, 1938, to E. W. Fawcett and Imperial Chemical Industries, Limited, discloses a sparingly soluble, fibrous-to-brittle product obtained by chlorination of polyethylene having average molecular weight from about 2000 to 24,000; also chlorinated natural paraffinic products, vinyl chloride polymers, and after-chlorinated vinyl chloride polymers have been described.

While all these products are useful for compounding protective coating and impregnating finishes, each is deficient in some respect for making high quality coating or impregnating compounds which are capable of the most economical application to articles by means such as dipping or brushing or spraying. Their most important deficiency is the inability to form, at ordinary temperatures with common solvents such as toluene, xylene or heavy naphtha, high-strength achromatic solutions which have low cloud point. By an achromatic solution, I mean one which is virtually colorless to the eye. Such a solution can be tinted or pigmented to any hue without having to compensate for or to tolerate the inherent color of the dissolved resin. Prior art soluble resins having the paraffinic skeletons of relatively high average molecular weight hydrocarbons—i. e. hydrocarbons of 4000 or higher average molecular weight—form, at least at desirably high concentrations of 20–40% by weight, solutions of undesirably high viscosity for application by dipping, brushing or spraying. The prior art products having the paraffinic skeleton of relatively low average molecular weight hydrocarbons are generally relatively soft and/or incompletely soluble, having cloud points well above 40° C. at 20% by weight concentrations in toluene.

The object of this invention is to provide chlorinated resins of essentially paraffinic skeleton which have the ability to form, at ordinary temperatures with common solvents such as toluene, xylene or heavy naphtha, high strength achromatic solutions having cloud point below 40° C.

A further object of this invention is to provide resins of the type described which are suitable for making coating and impregnating compositions which may be economically applied by brushing or spraying or dipping.

Another object of this invention is a process for making chlorinated resin having the above desirable attributes.

Other objects of this invention will appear hereinafter.

The product of my invention is the resin resulting from the chlorination of a wax reaction product of ethylene and a saturated $C_2$–$C_4$ alkanol, the bulk of said wax having molecular weight between 1000 and 3000, preferably between 1500 and 2500; with said wax having average molecular weight about 2000; said resin having 12 to 72 percent by weight chlorine and being capable of forming with toluene an achromatic solution of 20 weight percent resin content which exhibits a cloud point below 40° C.

My process comprises preparing a dispersion, in a chlorine-stable liquid medium, of wax derived from ethylene and a saturated $C_2$–$C_4$ alkanol, the bulk of said wax having molecular weight between 1000 and 3000 and said wax having average molecular weight about 2000, said dispersion containing no more than 20 grams of wax per 100 ccs. of said medium; maintaining said dispersion at temperatures between 30° and 80° C.; and introducing molecular chlorine into said dispersion until the resin resulting contains at least 12 percent by weight chlorine.

Figure 1 is a typical cloud point curve for my resin at various stages of chlorination with descriptive legends of the resin product imposed thereon. The cloud point plotted is for a 20 percent by weight solution of the resin in toluene. Other common organic solvents show similar behavior. The abrupt change in the cloud point characteristics at about 12 percent by weight chlorine is an unexpected and valuable property since it is indicative of high solubility and compatibility with common solvents to make clear solutions at low temperatures. It appears to be associated with transition from a crystalline waxy material to an amorphous material. The cloud point is virtually constant for toluene solutions of these resins over concentration range from about 5 to about 25 weight percent solids content.

Figure 2 is a typical plot of the hardness of my product for given weight percent chlorine content, the hardness being determined at 22° C. by penetration with an A. S. T. M. (American Society for Testing Materials) needle in 5 seconds bearing a total load of 200 grams (Krebs penetrometer).

By a saturated $C_2$–$C_4$ alkanol I mean specifically ethanol, n-propanol, isopropanol, n-butanol, secondary butanol, and isobutanol. An alkanol residue, in the sense the term is used in this application, is the univalent radical resulting from the separation of a hydrogen atom from the carbon atom to which the hydroxyl radical is attached. Thus, for the above $C_2$–$C_4$ alkanols, the alkanol residues are as follows:

TABLE I

| Alkanol | Alkanol Residue |
|---|---|
| ethanol | $CH_3\overset{|}{C}HOH$ |
| n-propanol | $CH_3CH_2\overset{|}{C}HOH$ |
| isopropanol | $CH_3\overset{|}{C}(OH)CH_3$ |
| n-butanol | $CH_3CH_2CH_2\overset{|}{C}HOH$ |
| secondary butanol | $CH_3CH_2\overset{|}{C}(OH)CH_3$ |
| isobutanol | $\overset{|}{C}H(OH)CH(CH_3)_2$ |

These residues can be dehydrated, producing olefinic unsaturation.

The wax starting material in my invention can be prepared from ethylene and a saturated $C_2$–$C_4$ alkanol by various procedures, e. g. maintaining substantially constant pressures between about 200 and 700 atmospheres and substantially uniform and constant temperatures between about 140° and 250° C. in a vapor phase reaction mixture of polymerization catalyst, ethylene and saturated $C_2$–$C_4$ alkanol, maintained at substantially constant concentrations by continuously supplying reaction mixture and withdrawing molten wax, with the input alkanol in proportions of about 1–25 cc. (as liquid) per 100 cc. of reaction space, as disclosed in my copending application Serial No. 270,255, filed February 6, 1952.

The chlorinated resins of my invention consist essentially of a mixture of long chain molecules probably having the following formula:

$$H(C_xCl_mH_{2x-m})R$$

where R is a saturated $C_2$–$C_4$ alkanol residue which can be wholly or in part dehydrated; $x$ is an integer from 70–200 averaging about 140; $m$ is an integer and averages between 8 and 150; i. e. the chlorine content is from 12 to 72 percent by weight. Particularly valuable resins, described in more detail below, are those in which the chlorine content is from 58 to 63 percent by weight, corresponding to average values for "$m$" between 80 and 100.

In the preparation of the resins, I chlorinate the wax dispersed in a chlorine-stable liquid medium such as carbon tetrachloride, tetrachloroethane, or tri-chlorofluoro methane. The dispersion concentration must be no more than 20 grams of the unchlorinated wax starting material per 100 ccs. of dispersing medium. If chlorination at dispersion concentrations above 20 grams of the wax per 100 ccs. of dispersing medium is attempted, the product gives hazy solutions in solvents and results in finishes which have impaired thermal stability and smoothness, as well as decreased adhesion to surfaces. By the word dispersion I mean finely-divided suspensions of, partial solutions of, and solutions of the wax in the liquid medium.

Chlorination of dispersions substantially below 10 grams per 100 ccs. wax in the liquid medium is uneconomical since it requires large size equipment for a given production rate in pounds per hour. In the preferred embodiment of my process I use a dispersion strength of about 10 grams per 100 ccs. wax in the liquid medium, the medium being carbon tetrachloride because of its availability and effectiveness for my purpose.

I can chlorinate with gaseous chlorine between 30° and 80° C. However, chlorination is very slow at temperatures below 45° C. At temperatures above 70° C. the solid resin products of my process are somewhat softer than those obtained at temperatures below 70° C. For producing a solid resin at the most rapid rate consistent with the best hardness properties, I prefer to chlorinate at temperatures between 60° and 70° C.

Catalysis of the chlorination reaction with light serves to increase the reaction rate, especially when chlorinating to make resins having in excess of 50 percent chlorine content. For a source of light ordinary tungsten lamps are satisfactory, but greater reaction speed can be obtained from the use of ultra-violet lamps. Free-radical type catalysts such as benzoyl peroxide are also suitable for accelerating the reaction. Operating under pressure is also possible for increasing the rate of chlorination.

Suitable materials of construction for the chlorination reactor are glass preferably; non-corrosive metal alloys also can be used.

When chlorination to the desired degree has been accomplished, the resin can be separated from the dispersing medium, e. g. by evaporation of the medium, or by precipitation of the resin with methanol, followed by filtration and drying.

My chlorinated resin is compatible with a wide range of organic materials such as "Cumar" (paracoumarone-indene type) resins, polyisobutylene, and rubber hydrochloride. It is remarkably soluble in common aromatic solvents such as toluene, xylene, and heavy naphtha, forming clear achromatic solutions with these solvents.

The semisolid and viscous liquid resins of my invention having chlorine content up to about 55 percent by weight are suitable as ingredients for impregnating or plasticizing compositions. The resins above about 25 percent by weight chlorine do not support combustion.

The resins of my invention having from about 58–63 percent by weight chlorine, i. e. those in which "$m$" of the above formula is between 80 and 100, form, in aromatic solvents, dispersions of better than 40% solids content from which protective coating films having high gloss, good adhesion and flexibility, and approximately the same hardness as that of the original wax starting material are obtained upon air drying at 20°–80° C.

Hardness of my products increases rapidly as the chlorine content rises above 63 percent by weight, but the products become correspondingly more brittle and powdery. These changes appear to accompany transition from a resinous, largely amorphous material to a crystalline material.

The plateau in hardness, gloss, adhesion, flexibility, and solubility which my resins exhibit in the 58–63 percent chlorine range allow use of simple, conventional means of control, such as periodic sampling, in chlorination processes leading to products with the above-described combination of desirable properties.

The resin having about 72 percent by weight chlorine is very hard, brittle, and glass-like. It is suitable as an extender for polyvinyl chloride lacquers as well as for flame-proofing applications.

Flexibility of films from the solid resins of my invention can be enhanced by blending the resin with elastic materials such as polyisobutylene or rubber hydrochloride. It is possible to increase adhesion of the resin to metal by use of conventional primer coats. While the chlorinated resins of my invention are reasonably stable at ordinary temperatures, it is advisable to mix with them a small amount of a stabilizer such as dibutyl tin maleate where temperatures as high as 135°–150° C. are expected to be encountered in their employment.

The following examples are intended to illustrate my invention but are not intended to limit it:

*Example 1.*—A two liter, 3-neck, round-bottom Pyrex glass flask was fitted with a reflux condenser, thermometer, sealed stirrer, gas dispersion pipe, and a heating mantle. Into 1 liter of carbon tetrachloride was introduced 100 grams of crushed wax, a hard waxy reaction product of ethylene and isopropanol having penetration hardness of the order of 0.1–0.5 mm. and softening point in the vicinity of 100° C., with average molecular weight about 2000 and with the bulk ranging in molecular weight from 1500 to 2500. The mixture was brought up to reflux temperature slowly. When the wax had dissolved, the temperature was lowered to about 60°–70° C. The suspension thus obtained was maintained between 60° and 70° C. and stirred vigorously. A stream of gaseous chlorine was introduced to the dispersion of wax and numbered samples were taken at intervals to determine chlorine content. During the last 12 hours of chlorination the flask was illuminated with a 150-watt tungsten filament light bulb.

Samples were precipitated with methanol and dried. The penetrometer hardness pattern of the samples was similar to that shown in Fig. 2. Because of the small size of the samples taken, cloud points were determined at 5% by weight of the resin sample in toluene, the cloud points at this concentration being essentially the same as those shown in Fig. 1 for 20% by weight of the resin in toluene. Resin samples (1c) through (9) formed achromatic solutions with toluene. The following table summarizes the results of the operation:

| Sample No. | Chlorination Time (hrs.) | Percent Chlorine | M. P., °C. | Cloud Point, °C. | Description of Product |
|---|---|---|---|---|---|
| 0 | 0 | 0 | 103 | 66 | White, hard wax. |
| 1a | 0.25 | 0.7 | 102 | 63 | Do. |
| 1 | 4.0 | 7.5 | 99 | 60 | Do. |
| 1b | 6 | 11.3 | 81 | 57 | Pliable waxy solid. |
| 1c | 6.5 | 13.2 | 78 | 38 | Tacky, semisolid. |
| 2 | 8 | 18 | 40 |  | Do. |
| 3 | 12 | 22 | 22 | 35 | Viscous semisolid. |
| 4 | 16 | 29 | 22 |  | Tacky, very viscous liquid. |
| 5 | 20 | 39.4 | 22 | 33 | Viscous liquid. |
| 7 | 28 | 55 | (¹) | 30 | White, soft pliable solid. |
| 8 | 32 | 64 | (¹) | 22 | Hard, white solid. |
| 9 | 35 | 72 | 200 | 22 | Very hard glass-like brittle, solid. |

¹ Material did not have defined melting point, but became increasingly viscous with the application of heat and decomposed at about 150° C.

*Example 2.*—Wax similar to that described in Example 1 and having penetrometer hardness about 0.4 mm. was chlorinated by the procedure of Example 1 until a resin having 58 percent chlorine content was obtained. At the end of the chlorination, the reaction mixture was distilled until a thick syrup remained in the flask. The syrup was added slowly to about 5 times its volume of methanol, stirred vigorously, and the precipitated product then filtered and dried. It had penetrometer hardness of 0.4 mm. A portion of the resin product was dissolved in toluene. It formed a clear achromatic solution having cloud point about 25° C. at 20 percent by weight solids content.

Samples of the resin in toluene solution were cast onto mild steel test panels to form films approximately 1 mil thick, which were then dried to clear, smooth, glossy resin coatings. One steel panel was tested by warping it over an 8-inch mandrel. No cracks or peeling appeared in the coating, indicating its good adhesion and flexibility. Several of the test panels were partially immersed in sea water for a period of three weeks. At the end of this time no rusting of the panels was discerned from critical visual inspection.

*Example 3.*—A sample of resin similar to that of Example 2 was dissolved in toluene and applied by brush to the inside of a paper container. After air-drying overnight at room temperature the container was filled with water, and no water loss was observed over a period of several days. Linoleum coated in a similar manner did not spot when sprinkled with water.

The viscosity (4000 to 10,000 centipoises at 25° C.) of the liquid resins of my invention is of particular value in the impregnation of cloth or paper since it allows good resin "pickup" per pass of the sheet material running continuously through a hot bath. Blending these liquid resins with highly chlorinated natural paraffin enhances the pickup properties of the latter material.

The solid resins of my invention form at ordinary temperatures, e. g. 25° to 35° C., with common organic solvents such as carbon tetrachloride, trichloroethylene, toluene, xylene, acetone, cyclohexanone, tetrahydrofuran, and dimethyl formamide, clear solutions having viscosity from about 100 to 500 centipoises at solid contents sufficiently high, e. g. 20 to 50 percent by weight, to give satisfactory one-coat lacquer coverage. Such solutions are of a viscosity suitable for application to surfaces by use of ordinary paint brushes without encountering fatiguing brush drag, or by use of spray guns without having to resort to hot lacquer techniques.

I claim:

1. A resin resulting from chlorination of the hard, high-melting wax reaction product of polymerizing ethylene in presence of a saturated $C_2$–$C_4$ alkanol, the bulk of said wax having molecular weight between 1000 and 3000, said wax having average molecular weight about 2000; said resin having 12 to 72 percent by weight chlorine and being capable of forming with toluene an achromatic solution exhibiting cloud point below 40° C. at concentration of 20 weight percent of said resin.

2. A resin as defined in claim 1 having from 58 to 63 percent by weight chlorine.

3. A resin from chlorination of a wax reaction product of ethylene with isopropanol, the bulk of said wax having molecular weight between 1500 and 2500, said wax having average molecular weight about 2000; said resin having 12 to 72 percent by weight chlorine and being capable of forming with toluene an achromatic solution exhibiting a cloud point below 40° C. at concentration of 20 weight percent of said resin.

4. A resin as defined in claim 3 having from 58 to 63 percent by weight chlorine and having penetration hardness at least equal to that of the wax reaction product starting material, and capable of forming by casting from toluene solution on a mild steel panel a one mil film which does not crack or peel upon warping the panel over an 8 inch mandrel.

5. The process for making chlorinated hydrocarbon resins capable of forming with common organic solvents achromatic solutions having cloud points below 40° C. at concentrations of 20 weight percent of said resin, which comprises: preparing a dispersion, in a chlorine-stable liquid medium, of wax derived from polymerizing ethylene in presence of a saturated $C_2$–$C_4$ alkanol, the bulk of said wax having molecular weight between 1000 and 3000 and said wax having average molecular weight about 2000, said dispersion containing no more than 20 grams of wax per 100 cc. of said medium; maintaining said dispersion at temperatures between 30° and 80° C.; and introducing molecular chlorine into said dispersion until the resin resulting contains at least 12 percent by weight chlorine.

6. The process defined in claim 5 wherein temperatures are maintained between 60° and 70° C., and catalysis is employed during introduction of chlorine.

7. The process for making chlorinated hydrocarbon resins capable of forming with common organic solvents achromatic solutions having cloud points below 40° C. at concentrations of 20 weight percent of said resin, which comprises: preparing a dispersion, in a chlorine-stable liquid medium, of wax derived from polymerizing ethylene in presence of isopropanol, the bulk of said wax having molecular weight between 1500 and 2500 and said wax having average molecular weight about 2000, said dispersion containing no more than 20 grams of wax per 100 cc. of said medium; maintaining said dispersion at temperatures between 60° and 70° C.; and introducing molecular chlorine into said dispersion until the chlorine content of the resin resulting is from 12 to 72 percent by weight.

8. The process defined in claim 7 wherein the dispersion strength is about 10 grams of wax per 100 cc. of dispersing medium, introduction of chlorine is continued until the resin contains from 58 to 63 percent chlorine by weight, and actinic light is employed during introduction of chlorine.

References Cited in the file of this patent

UNITED STATES PATENTS

| | | |
|---|---|---|
| 2,398,803 | Myles | Apr. 23, 1946 |
| 2,402,137 | Hanford | June 18, 1946 |
| 2,504,400 | Erchak | Apr. 18, 1950 |